United States Patent [19]

Naidu et al.

[11] Patent Number: 5,144,564
[45] Date of Patent: Sep. 1, 1992

[54] ROTOR POSITION ESTIMATION OF A PERMANENT MAGNET SYNCHRONOUS-MACHINE FOR HIGH PERFORMANCE DRIVE

[75] Inventors: Malakondaiah Naidu, Utica, Mich.; Bimal K. Bose, Knoxville, Tenn.

[73] Assignee: University of Tennessee Research Corp., Knoxville, Tenn.

[21] Appl. No.: 638,691

[22] Filed: Jan. 8, 1991

[51] Int. Cl.$^5$ .............................................. H02P 1/04
[52] U.S. Cl. .................................. 364/494; 364/483; 318/721
[58] Field of Search ............... 364/483, 494, 495, 565, 364/492; 318/254, 721, 722; 310/156; 324/177

[56] References Cited

U.S. PATENT DOCUMENTS

| | | | |
|---|---|---|---|
| 4,238,717 | 12/1980 | Knight et al. | 318/254 |
| 4,245,181 | 1/1981 | Plunkett | 318/805 |
| 4,455,513 | 6/1984 | Fulton et al. | 318/721 |
| 4,654,566 | 3/1987 | Erdman | 318/254 |
| 4,677,360 | 6/1987 | Garces | 318/803 |
| 4,814,677 | 3/1989 | Plunkett | 318/254 |
| 4,922,169 | 5/1990 | Freeman | 318/254 |
| 4,928,043 | 5/1990 | Plunkett | 318/721 |

*Primary Examiner*—Parshotam S. Lall
*Assistant Examiner*—Michael Zanelli
*Attorney, Agent, or Firm*—Flehr, Hohbach, Test, Albritton & Herbert

[57] ABSTRACT

The invention comprises an apparatus and a method for controlling permanent magnet AC machines. Stator voltages and stator currents are sensed to produce signals which are utilized by a digital circuit to calculate control signals for the machine.

8 Claims, 4 Drawing Sheets

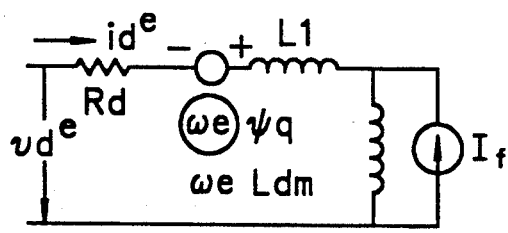
FIG. 3
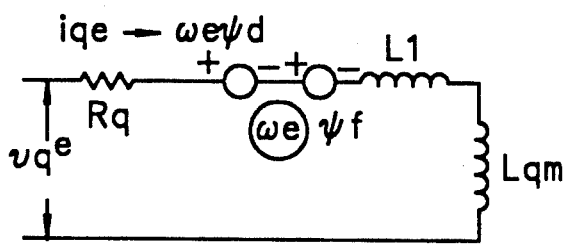
FIG. 4
FIG. 5
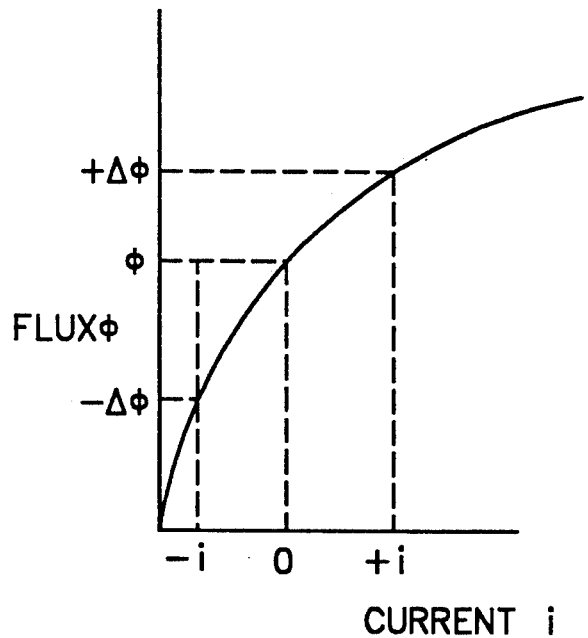
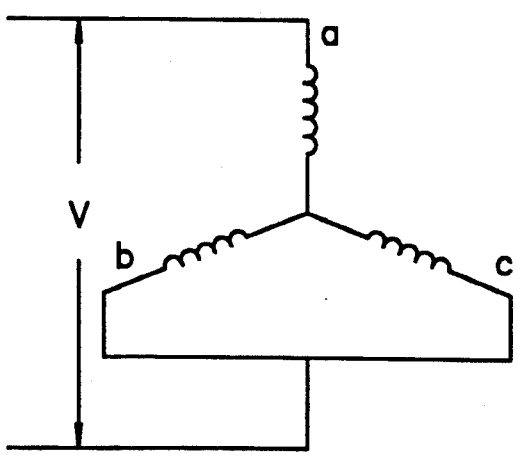
FIG. 6

5,144,564

ROTOR POSITION ESTIMATION OF A PERMANENT MAGNET SYNCHRONOUS-MACHINE FOR HIGH PERFORMANCE DRIVE

BACKGROUND OF THE INVENTION

Summary of the Prior Art

Permanent Magnet Synchronous machines are emerging as candidates for industrial drive applications. High energy permanent magnets and the use of high speed micro-processors are primary factors contributing to the popularity of the systems. For high performance applications, absolute rotor position and speed signals, which have been typically provided by shaft mounted sensors, are required. Such sensors are expensive, and in general, unreliable.

Summary of The Invention

All permanent magnet synchronous machines with sinusoidally distributed windings exhibit salient pole characteristics whether the machine is of the wound rotor type with interior magnets or surface magnets or flat disc type.

The controller and methods which are the subject matter of this invention exploits these salient pole characteristics of permanent magnet synchronous machines to calculate the rotor position and rotor speed thus eliminating the sensors which prior art systems required to measure rotor position and speed.

Specifically, the controller estimates (calculates) the rotor position and speed of a permanent magnet synchronous machine based on measured operating parameters of the machine. The specific calculation utilizes a mathematical model of a typical permanent magnet synchronous machine and measurements of the stator currents and the stator voltages.

Under rotating conditions the operating stator voltages and the operating stator currents are measured to generate signals which are utilized to calculate the rotor position and rotating speed. When the rotor is static, high frequency voltage, not producing rotation, is applied to the stator. The amplitude of stator voltages and the current flowing in the stator windings are measured to produce signals permitting the stator position under static conditions to be estimated. The calculated parameters are utilized to control the machine in accordance with known control techniques. This method eliminates both rotor position and speed sensors associated with prior art controllers. Eliminating these sensors significantly improves the performance and the reliability of the system.

DESCRIPTION OF THE DRAWINGS

FIG. 3 is an equivalent circuit of the permanent magnet synchronous machine.

FIG. 4 is a second equivalent circuit of the permanent magnet synchronous machine.

FIG. 5 is a curve of the magnetic flux produced by the permanent magnet synchronous machine as a function of stator current.

FIG. 6 is a diagram illustrating the connection of the stator windings used to calculate the rotor polarity.

DETAILED DESCRIPTION

During rotating conditions the stator currents and the stator voltages are measured to generate signals which are utilized by the controller to calculate the rotor speed and position. During stationary rotor conditions a high frequency voltage is applied to the stator. The stator voltages and the stator currents are measured to generate high frequency stator voltage and high frequency stator current signals. These signals are used to calculate the static rotor position.

A generalized phasor diagram (FIG. 2) and equivalent circuits (FIG. 3 & FIG. 4) of a typical permanent magnet synchronous machine are utilized to construct a mathematical model of the machine. This mathematical model in conjunction with the measured stator voltage and the stator current signals are utilized to calculate the rotor position and speed under all conditions. Control signals for the machine are calculated based on the rotor speed and position. These features of the controller are described in detail below.

Figure 2:
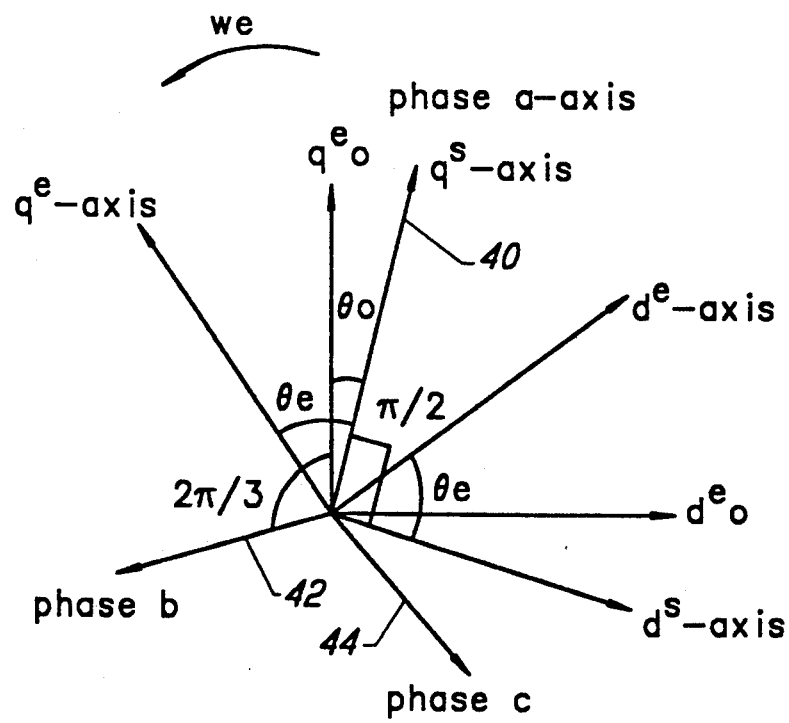
FIG. 2 is a phasor diagram illustration of the characteristics of the permanent magnet synchronous machine.

FIG. 2 is a phasor diagram of a permanent magnet synchronous machine 20 in stationary and rotating reference frames. This phasor diagram fully describes the machine 20 and is used to describe the functioning of the controller and to produce equations comprising a mathematical model of the machine 20. This mathematical model in conjunction with measured stator voltage and stator current signals is utilized to calculate signals which control the machine, in accordance with the invention. Stated another way, this mathematical model is incorporated into the controller.

In FIG. 2, vectors 40, 42, and 44, respectively, represent the phase of the three stator windings. These vectors are fixed in space by the mechanical characteristics of the machine 20 and displaced from each other by 120 degrees. The corresponding stationary frame axes are represented by $d^s$ and $q^s$.

In constructing the mathematical model, it is assumed that $q^s$ is in phase with the a-axis. The synchronously rotating reference frame associated with the machine is represented by the $d^e$–$q^e$ axes, which are orthogonal to each other and rotate at an angular speed equal to the rotational speed of the rotor.

FIGS. 3 and 4 represent the equivalent circuit of the permanent magnet synchronous machine 20. These equivalent electrical circuits define the electrical operating parameters of the machine 20 and are used in conjunction with the phasor diagram, FIG. 2, to construct the mathematical model.

Typical control parameters are calculated by assuming that the rotor pole axis is aligned with the $d^e$ axis. The rotating frame axes at static condition when the rotation is equal to $\Theta_o$ is represented by the $d^e o$ axes and the $q^e o$ xes.

When the $q^e$ axis is positioned at an angle $\Theta e$ with the $q^s$ axes and moving at an angular velocity $\omega e$, the following method is utilized to calculate the rotor position and speed.

Figure 1:
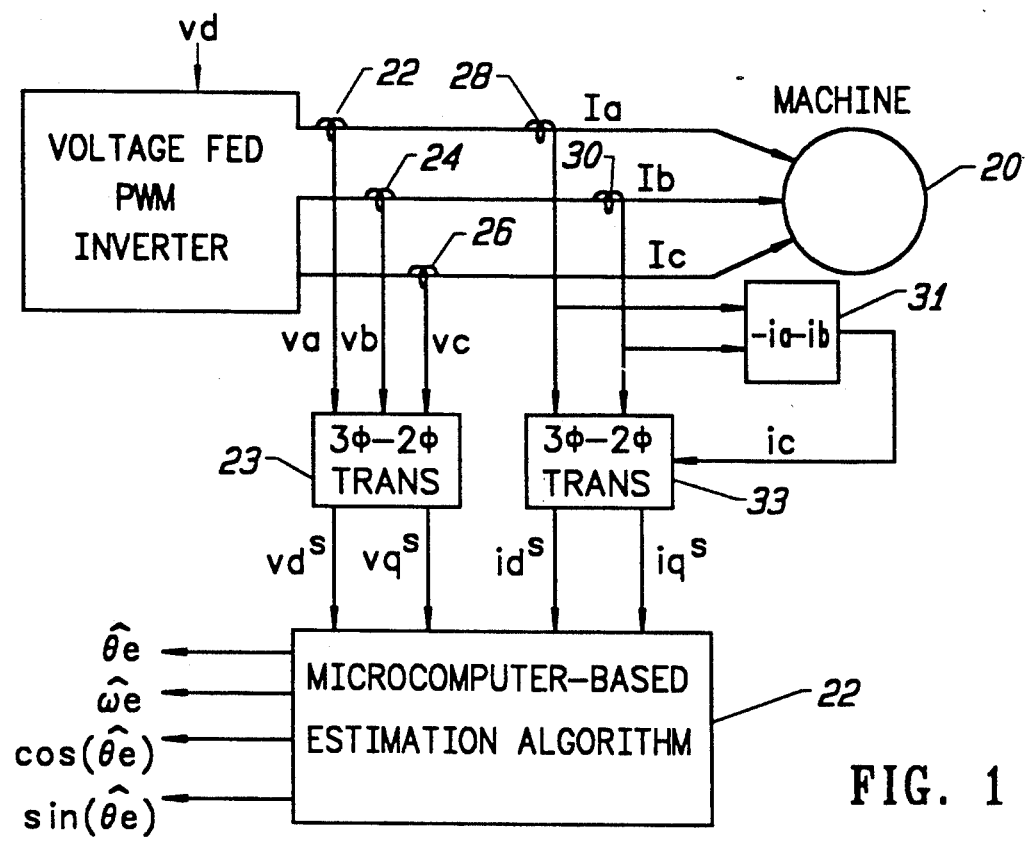
FIG. 1 is a block diagram of the apparatus utilized to calculate the angle of the rotor and speed under rotation conditions.

Specifically, FIG. 1 is a functional block diagram illustrating the calculation of the rotor position and speed under rotating conditions. Functionally, the stator voltages and stator currents of the machine 20 are sensed by sensors, 22–30. The three phase voltage signals produced by sensors 22, 24, and 26 are converted to a two phase signal by a first conversion circuit 23.

Similarly, current signals representing phases "a" and "b", provided by sensors 28 and 30 are utilized by a second calculation circuit 31 to calculate the current for phase "c". A third calculation circuit 33 converts the three phase current signals to a two phase current signal. The two phase voltage and current signals are utilized by a micro-processor 22 to calculate the rotor position and the rotor speed in accordance with predetermined relationships determined by the mathematical model, described above. These calculated parameters are represented as the rotor angle $\hat{\theta}_e$, the rotor speed, $\hat{\omega}e$ the sine of the rotor angle $\sin(\hat{\theta}_e)$ and the cosine of the rotor angle $\cos(\hat{\theta}_e)$. These values are utilized to calculate control signals for the machine during rotating conditions, as further described below. Calculation of this type are well known in the prior art.

ESTIMATION OF ROTOR POSITION AND SPEED UNDER ROTATING CONDITION

As explained above, a mathematical model of the machine is used to calculate the control parameters. This model is developed below as a series of equations. Each of the equations comprising the model is assigned an equation number. This is a technique permitting each of the equations to be uniquely identified for reference purposes. This is a convenient technique because a specific calculation frequently depends on a previously developed equation.

Various parameters related to the machine under rotating condition can be calculated as follows.

Assuming that the $q^e$ axis is at an angle $\theta_e$ with $q^S$-axis and moving with an angular velocity $\omega e$, $\theta_e$ can be calculated as follows.

$$\theta_e = \omega e t + \theta_o \qquad \text{Equation (1)}$$

where $\theta_o$ is the initial rotor position.

Expressing the three phase stator voltages and currents in terms of stationary reference frame permits the following parameters to be calculated.

$$vq^s = vas \qquad \text{Equation (2)}$$

$$vd^s = -(vbs - vcs)/\sqrt{3} \qquad \text{Equation (3)}$$

$$iq^s = ias \qquad \text{(Equation 4)}$$

$$id^s = -(ibs - ics)/\sqrt{3} \qquad \text{Equation (4)}$$

Where ias, ibs and ics are the stator phase currents and vas, vbs and vcs are the stator phase voltages.

From the $d^e$-axis and the equivalent circuit of a PM synchronous machine shown in FIG. 3, the de-axis voltage is calculated as follows.

$$vd^e = (Rd + p\,Ld)id^{ei} - \omega e\,Lq\,iq^e \qquad \text{Equation (6)}$$

$$Ld = L_1 + Ldm \qquad \text{Equation (7)}$$

Where, $L_1$ is the stator leakage inductance and Ldm is the d-axis magnetizing inductance.

Transforming $id^s$ and $iq^s$ into $d^e$ and $q^e$ axes permits $id^e$ to be calculated as follows.

$$id^e = id^s \cos(\Theta_e) + iq^s \sin(\Theta_e) \qquad \text{Equation (8)}$$

$$iq^e = -id^s \sin(\Theta_e) + iq^s \cos(\Theta_e) \qquad \text{Equation (9)}$$

Substituting equation (8) and equation (9) into equation (6) yields the following equation for $v_d^e$.

$$vd^e = \cos(\Theta_e)[Rd\ id^s + Ld\ pid^s - \omega e(Lq-Ld)\ iq^s] + \sin(\Theta_e)[Rq\ iq^s + Ld\ piq^s + \omega e(Lq-Ld)\ id^s] \qquad \text{Equation (10)}$$

Where:
Rd = d-axis stator resistance.
Ld, Lq = d and q axes inductances respectively.

Transforming $vd^s$ and $vq^s$ voltages onto de axis permits $vd^e$ to be calculated as follows.

$$vd^e = vd^s \cos(\theta_e) + vq^s \sin(\theta_e) \qquad \text{Equation (11)}$$

Equating equation (10) and equation (11) permits the tangent of the rotor angle to be calculated, as follows.

$$\tan(\theta_e) = x/y \quad \theta_e = \omega t \qquad \text{Equation (12)}$$

Where:
p = derivative operator, d/dt.

$$x = [-vd^s + Rd\ id^s + Ld\ pid^s - \omega e(Lq-Ld)\ iq^s] \qquad \text{Equation (13)}$$

$$y = [vq^s - Rq\ iq^s - Ld\ piq^s - \omega e(Lq-Ld)\ id^s] \qquad \text{Equation (14)}$$

$$\cos(\theta_e) = y/z \qquad \text{Equation (15)}$$

$$\sin(\theta_e) = x/z \qquad \text{Equation (16)}$$

$$z = \sqrt{(x^2 + y^2)} \qquad \text{Equation (17)}$$

From the $q^e$-axis and the equivalent circuit as shown in FIG. 4, $vq^e$ can be determined by the following relationship.

$$vq^e = (Rq + pLq)iq^e + \omega e\,Ld\,id^e + \omega e\,\Psi f \qquad \text{Equation (18)}$$

$$Lq = L_1 + Lqm \qquad \text{Equation (19)}$$

Where:
Rq = q-axis stator resistance.
$\Psi f$ = Permanent magnet flux linkages.
$L_1, Ldm$ = The stator leakage inductance and the $d^e$-axis magnetizing inductance respectively.

Substituting equation (8) and equation (9) into equation (18) gives the following value for $vq^e$.

$$vq^e = \cos(\theta_e)[Rq\ iq^s + Lq\ piq^s - \omega e(Lq-Ld)id^s] + \sin(\theta_e)[-Rd\ id^s - Lq\ pid^s - \omega e(Lq-Ld)iq^s] + \omega e\,\Psi f \qquad \text{Equation (20)}$$

The transformation of vds and vqs onto $q^e$-axis defines $vq^e$ as follows.

$$vq^e = -vd^s \sin(\theta_e) + vq^s \cos(\theta_e)$$

Equating equation (20) and equation (21) yields $$[vq^s - Rq\ iq^s - Lq\ iq^s + \omega e(Lq-Ld)\ id^s] = \tan(\theta_e)[vd^s - Rd\ id^s - Lq\ pid^s - \omega e(Lq-Ld)iq^s] + \omega e\,\Psi f/\cos(\theta_e)$$

Substituting equation (12) and equation (15) into equation (22) gives $$[vq^s - Rq\ iq^s - Lq\ piq^s + \omega e(Lq - Ld)id^s]\ [vq^s - Rq\ iq^s -$$

-continued $$Ld\ piq^s + \omega e(Lq - Ld)piq] + [-vd^s - Rd\ id^s - Ld\ pid^s +$$

$$\omega e(Lq - Ld)iq^s][vd^s - Rd\ id^s - Lq\ pid^s - \omega e(Lq - Ld)iq^s] -$$

$$\omega e\Psi f\{[-vd^s + Rd\ id^s + Ld\ pid^s - \omega e(Lq - Ld)iq^s]^2 +$$

$$[vq^s - Rq\ iq^s - Ld\ piq^s - \omega e(Lq - Ld)id^s]^2\}^{\frac{1}{2}} = 0$$

The speed, $\omega e$, can be obtained by solving the above fourth order equation which may result in computational complexity for real time application. In order to alleviate this problem, it is assumed that the mean value of d and q axes inductances are equal in computing the speed, $\omega e$.

The mean value of these inductances are given by the following equations.

$$Lda = Lqa = (Ld + Lq)/2 \qquad \text{Equation (24)}$$

This assumption results in very small error in computing the speed, as the contribution of saliency terms in computing $\omega e$ is negligible.

Substituting (12) and (15) in (22) with (24) gives $$\omega e = [\sqrt{\{(vq^s - Rq\ iq^s - Lqa\ piq^s)^2 + (vd^s - Rd.id^s - Lda\ pid^s)^2\}}]/\Psi f \qquad \text{Equation (25)}$$

The rotor position, $\theta_e$, can be computed by substituting (25) into (12).

For successful operation of PM synchronous machine drive, absolute rotor position is required. In order to obtain absolute rotor position, initial rotor position is to be estimated.

ROTOR POSITION ESTIMATION WHEN ROTOR SPEED IS ZERO

The permanent magnet synchronous machine 20 exhibits salient pole characteristics whether the machine is surface magnet type, or interior magnet type, or flat disc type. Due to existence of salience between $d^e$ and $q^e$ axes, the inductance of the individual windings vary with rotor relative position. When the rotor is at stationary condition, the rotor position can be obtained by letting $\omega e = 0$ in the Equation (12). This may not be a true value, as the polarity of the magnet in the vicinity of phase a-axis may be N or S. The true value of the initial rotor position can be obtained by adding O or $+\pi$ to the computed $\theta_e$ depending upon the polarity of the magnet.

When the rotor is at stationary condition, then, $\omega e = 0$ and $\theta_e = \theta_o$. Substituting $\omega e = 0$ and $\theta_e = \theta_o$ in (12) gives $$\tan(\theta_o) = x_o/y_o \qquad \text{Equation (26)}$$

Where:

$$x_o = [-vd_s + Rd\ id_s + Ld.pid^s] \qquad \text{Equation (27)}$$

$$Y_o = [vq^s + -Rq\ iq^s - Ld.piq^s] \qquad \text{Equation (28)}$$

The true initial rotor angle depends upon the polarity of the rotor magnet. The polarity of the rotor magnet is determined as described below.

PERMANENT MAGNET POLARITY DETECTION

The polarity of the rotor is determined based on the non-linear magnetization characteristic of the stator, illustrated in FIG. 5, and the connection of the rotor windings illustrated in FIG. 6.

The armature core under the pole axis of the field magnet will magnetize intensively against the polarity of the rotor. As a result, when a voltage is applied to the armature phase winding, the ratio of increase in the instantaneous value of phase current changes according to the polarity of the applied voltage. For example, consider the polarity of the magnet in the vicinity of the phase a is N, and if the applied voltage is of positive polarity which aids the magnetization, then the current in the phase winding increases faster than that of the current with applied voltage with negative polarity which decreases the magnetization. This results from the non-linear magnetization characteristic of the permanent magnet synchronous motor stator core as shown in FIG. 5.

In practice, by applying a high frequency square wave voltage of alternating polarity and measuring the magnitude of the phase current in each case, the polarity of the magnet can be detected. The rotor magnet polarity detection circuit is shown in the FIG. 6.

FIG. 6 illustrates the connection of the stator windings used to calculate (estimate) the rotor position under zero rotor speed conditions utilizing this connection. A triangular high frequency signal $iq^{*e}$ (about 10 times the rated frequency) is fed to the vector rotator so that the rotor does not move under this signal.

More specifically, initially, arbitrary unit vectors, say $\cos(\theta_e) = 1$ and $\sin(\theta_e) = 0$ are fed to the vector rotator. With $id^*_e = 0$, the inverter feeds Pulse Width Modulated voltages to the machine 20 which produces pulsating torque in the machine with zero average torque. By measuring the stator voltages and currents, the rotor position can be estimated using Equation (12). The true initial rotor position can be obtained by adding the output of the polarity detection to the computed angle. The unit vectors $\sin(\theta_{eo})$ and $\cos(\theta_{oe})$ are synthesized in the microprocessor and fed to the vector rotator.

Figure 7:
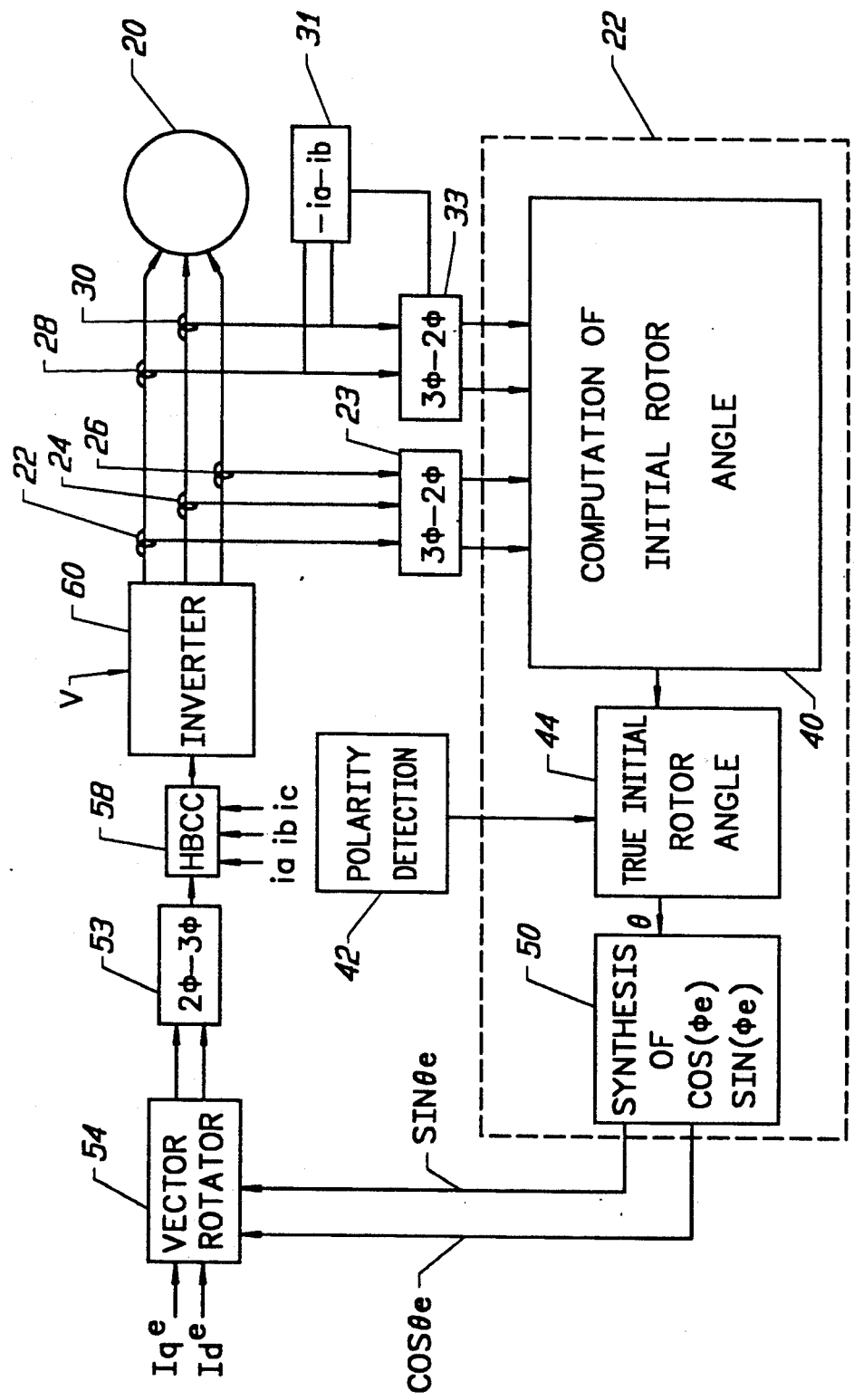
FIG. 7 is a block diagram illustrating the apparatus used to calculate the rotor position under static rotor conditions.

The complete block diagram of a vector-controlled PM synchronous machine controller with position estimation algorithm for stationary rotor conditions is shown in FIG. 7.

More specifically, in FIG. 7 the details of the microprocessor 22 has been illustrated as functional blocks to more clearly illustrate the functions performed. Additionally the other elements of the controller have been added to illustrate the operation of the controller under stationary rotor conditions.

As illustrated in this FIG. 7 the stator voltages and the stator current signals are first utilized to calculate the rotor angle, as illustrated at reference numeral 40. A rotor polarity detection circuit generates a polarity signal which is combined with the rotor angle signal to determine the true initial rotor angle and generates a rotor position signal. Utilizing the rotor position signal angle, a computation is performed to calculate the sine and the cosine of the rotor angle as indicated at reference numeral 50. These signals are combined with a high frequency current reference signal $Iq^{e*}$ by a vector rotator circuit 54 to produce a conventional two phase control signal. A two phase to three phase converter circuit 53 converts the two phase signals to a three phase signal to produce conventional control signals for a hysteresis band controller 58. In response to the control signal and the phase currents of the machine 20, the controller 58 controls a conventional inverter 60. As previously discussed, the frequency of the signal $I_q^e$ is selected such that the rotor does not rotate and the connections of the stator windings are controlled to permit the necessary calculations to be made.

Figure 8:
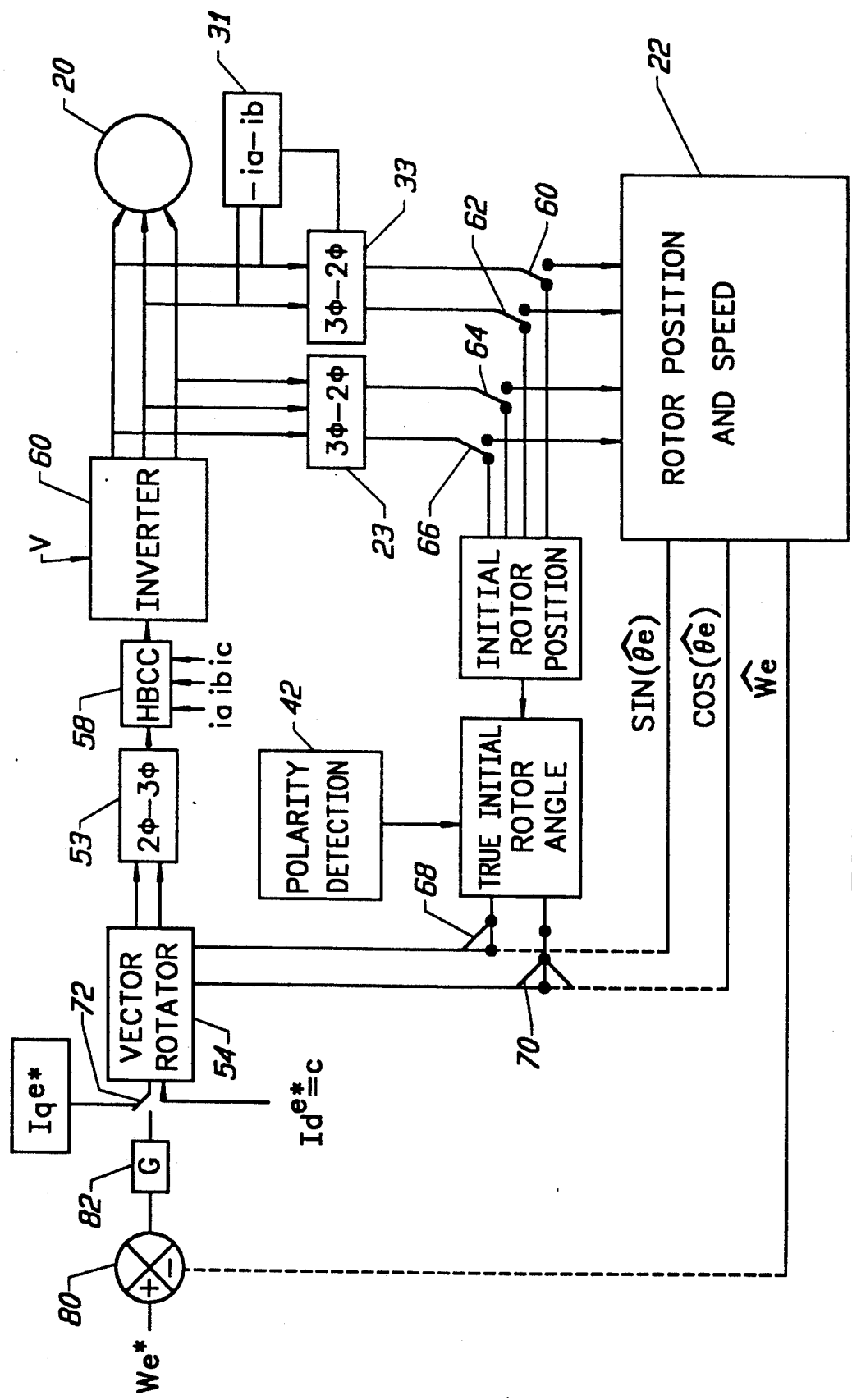
FIG. 8 is a diagram of the complete system.

The functions of the initial rotor calculations, described above, are incorporated into the complete controller as illustrated in FIG. 8. In this FIG. 8, functions which are identical to those described in previous illustrations use the same reference numerals.

In this figure switches 60–70 are used to switch between the stationary rotor mode and the rotation mode. More specifically, when these switches are positioned as illustrated in FIG. 8, the controller operates in the stationary rotor mode, as previously described. When these switches are in their second position, the controller operates in its rotary mode. The stationary mode was previously described. The rotary mode is described below.

In this mode a desired rotation speed signal $\omega e^*$ is coupled as an input to a subtractor 80 where it is combined with the rotation vector $\omega e$ to produce a difference signal. A difference processing circuit 82 process this signal to produce the $Iq^e$ signal. Vector Rotator 54 receives as inputs the $Iq^e$ signal, $Id^e$ signal, the sine vector and the cosine vector, and produces the two phase control signal which is coupled as an input to the two phase to three phase converter 53. The remainder of the controller operates as previously described.

The controller can be implemented using commercially available circuits and techniques. Selected portions of the controller are preferably implemented using a programmed digital computer. Other portions may be hand wired circuits due to the speed requirements. Still other portions may utilize conventional analog circuits.

We claim:

1. A method for controlling a permanent magnet synchronous machine including a stator having at least three windings such that said permanent magnet synchronous machine rotates in a desired direction at a desired speed, including the steps of:
   a) electrically determining if a rotor of said machine is stationary to generate a zero rotation state signal;
   b) selectively applying electrical signals to said stator in response to said zero rotation state signal to generate a stationary rotor position signal;
   c) measuring the operating voltages applied to and the operating currents flowing in said stator windings and in response thereto calculating a rotational velocity signal and a rotor position signal; and
   d) utilizing said zero rotation state signal, said stationary rotor position signal, said rotor position signal and said rotational velocity signal to control said operating voltages applied to said stator windings to cause said rotor to rotate in the desired direction and at the desired speed.

2. The method in accordance with claim 1 wherein the step of selectively applying electrical signals to said stator in response to said zero rotation state signal includes the additional step of connecting at least two of said stator windings in parallel.

3. The method in accordance with claim 2 further including the step of generating first digital signals corresponding to the stator voltages and the stator currents and utilizing said first digital signals to calculate said stationary rotor position.

4. The method in accordance with claim 3 wherein said step measuring the operating voltages applied to and the operating currents flowing in said stator windings further includes the step of producing second digital signals corresponding to said operating voltages and said operating currents and utilizing these signals to calculate said rotational velocity signal and said rotor position signal.

5. A controller for a permanent magnet synchronous machine having at least three stator windings, comprising in combination:
   a) first means for determining the rotational state of a rotor of said machine to generate a zero rotation state signal;
   b) second means responsive to said zero rotation state signal to selectively apply electrical signals to said rotor such that said rotor remains stationary and for measuring the voltage applied to and the currents flowing in said stator windings to produce first voltage and first current signals;
   c) third means selectively responsive to said first voltage and first current signals to generate a rotor position signal;
   d) fourth means responsive to a second voltage applied to and the currents flowing in said stator winding to generator a rotor velocity signal; and
   d) fifth means responsive to said rotor position and rotor velocity signals to control said second voltage applied to said stator windings to cause said rotor to rotate in a desired direction and at a desired velocity.

6. A controller in accordance with claim 5 wherein said third means is a digital computer.

7. A controller in accordance with claim 6 wherein said digital computer is programmable.

8. A controller in accordance with claim 7 wherein said fourth means is also a programmable digital computer.

* * * * *